(12) United States Patent
Ternullo, Jr. et al.

(10) Patent No.: US 6,208,197 B1
(45) Date of Patent: Mar. 27, 2001

(54) INTERNAL CHARGE PUMP VOLTAGE LIMIT CONTROL

(75) Inventors: Luigi Ternullo, Jr.; Michael C. Stephens, Jr., both of San Jose, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 0 days.

(21) Appl. No.: 09/262,503

(22) Filed: Mar. 4, 1999

(51) Int. Cl.[7] ............................. G05F 1/10; G05F 2/02
(52) U.S. Cl. ........................................ 327/536; 327/390
(58) Field of Search ................................. 327/534, 535, 327/536, 537, 390

(56) References Cited

U.S. PATENT DOCUMENTS

| | | | |
|---|---|---|---|
| 5,038,325 | 8/1991 | Douglas et al. | 365/189 |
| 5,412,257 | 5/1995 | Cordoba et al. | 327/536 |
| 5,426,334 | * 6/1995 | Skovmand | 327/427 |
| 5,502,415 | 3/1996 | Matsui et al. | 327/536 |
| 5,592,370 | 1/1997 | Rogers | 363/60 |
| 5,627,739 | 5/1997 | Yung-Chow et al. | 363/60 |
| 5,629,843 | 5/1997 | Loughmiller et al. | 363/60 |
| 5,642,073 | 6/1997 | Manning | 327/536 |
| 5,689,208 | * 11/1997 | Nadd | 327/390 |
| 5,986,974 | * 11/1999 | Choi et al. | 365/189.11 |

* cited by examiner

Primary Examiner—Terry D. Cunningham
Assistant Examiner—Quan Tra
(74) Attorney, Agent, or Firm—Jiawei Huang; J. C. Patents (57) ABSTRACT

A charge pump limits the voltages at nodes internal to the charge pump to reduce the risk of junction breakdown in the charge pump. The charge pump includes a first pump circuit, a second pump circuit, a first clamp and a second clamp. The first clamp limits the voltage level of a well by providing a current path from the well to the output lead when the voltage level of the well reaches a first predetermined limit. The voltage level at a node from which charge is redistributed to the well is limited by the second clamp, which is configured to provide a conductive path from the node to the output lead when the voltage level of the node reaches a second predetermined limit. The pump circuits can each include a logic circuit that is configured, depending on the level of an external supply voltage, to reduce the rate at which the capacitor node is boosted when the external supply voltage is relatively high. The logic circuit can also vary the voltage difference between the capacitor node and the external supply voltage to decrease the relative voltage level at the capacitor node relative to the level of the external supply voltage. These features also help reduce the risk of junction breakdown in the charge pump.

31 Claims, 4 Drawing Sheets

INTERNAL CHARGE PUMP VOLTAGE LIMIT CONTROL

FIELD OF THE INVENTION

The present invention relates to integrated circuit charge pumps and, more particularly, to integrated circuit charge pumps with circuits to limit the voltage at nodes internal to the charge pump.

BACKGROUND INFORMATION

Figure 1:
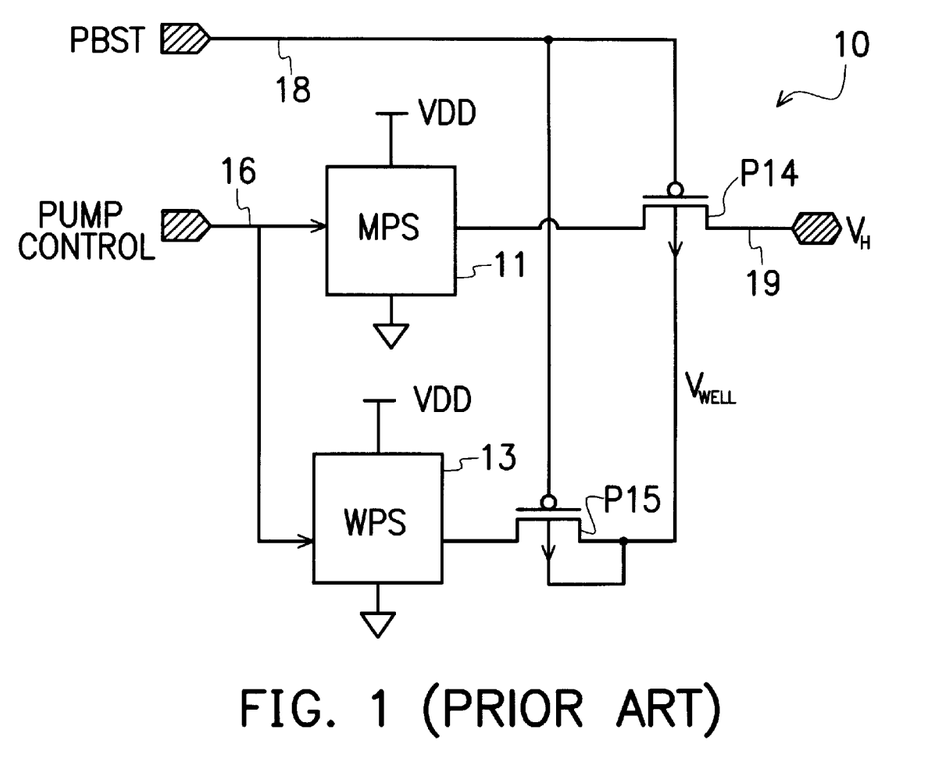
FIG. 1 is a block diagram illustrative of a conventional integrated circuit charge pump using P-channel transistor pass gates.

Some integrated circuits (i.e., chips) require supply voltages of different levels, which may be generated "on-chip" using voltage generators incorporated into the chip. For on-chip generated supply voltages that are higher than the externally supplied voltage or voltages, charge pumps are typically used as the voltage generator. FIG. 1 is a block diagram illustrative of a conventional integrated circuit charge pump 10 used to generate a supply voltage $V_H$ having a level that is higher than the level of the externally provided supply voltage. Charge pump 10 includes a main pump stage (WPS) 11, a well pump stage (WPS) 13, and two P-channel transistor P14 and P15 serving as pass gates. MPS 11 and WPS 13 are each connected to a VDD supply bus and a ground bus to receive power from an external power source (not shown) providing supply voltage VDD. In addition, MPS 11 and WPS 13 are connected to receive "n" (n representing an integer greater than zero) pump control signals through a control line 16. The output leads of MPS 11 and WPS 13 are connected to the sources of P-channel transistors P14 and 15, respectively.

P-channel transistors P14 and P15 have their gates connected to a line 18 to receive a pump boost control signal PMPBST. When asserted (i.e., a logic low level in this embodiment), signal PMPBST has a boosted level (i.e., a level that is higher than the normal VDD level) and is used to control charge transfer from the output leads of MPS 11 and WPS 13.

The drain of P-channel transistor P14 is connected to output lead 19, whereas the drain of P-channel transistor P15 is connected to the well of P-channel transistor P14. In this example, P-channel transistor P14 is implemented in an N-well. As is well known in the art of semiconductor devices, the well must be maintained at a potential (i.e., $V_{WELL}$) that is equal to or greater than the highest potential at either the source or the drain of P-channel transistor P14 for proper transistor operation. However, due to fluctuations in load current, the level of voltage $V_H$ at output lead 19 (i.e. the drain of P-channel transistor P14) will at times be greater than the level of the voltage at output lead of MPS 11 (i.e., the source of P-channel transistor P14). In addition, the voltage level at the source of transistor P14 at times is greater than the level of voltage $V_H$. Thus, simply tying the well to the source or the drain of P-channel transistor P14 would not be effective.

To address this issue, charge pump 10 uses WPS 13 to maintain the level of voltage $V_{WELL}$ at a predetermined level that is higher than the maximum voltage levels of the source and drain of P-channel transistor 14. Those skilled in the art will appreciate that the capacitance and leakage of the well of P-channel transistor P15 is typically relatively small and, thus, the voltage level at the source of P-channel transistor P15 will generally always be greater or equal to the voltage level of the well. Consequently, tying the drain of P-channel transistor P15 to the well is effective in maintaining the voltage level of the well at or above the voltage levels at the source and drains of P-channel transistor P15.

To maintain supply voltage $V_H$ at the desired level, a control circuit (not shown) conventionally provides the pump control signals on line 16 so as to cause MPS 11 and WPS 13 to transfer charge to the sources of P-channel transistors P14 and P15, respectively. Pump boost signal PMPBST is used to control the state of P-channel transistors P14 and P15 to transfer charge from MPS 11 and WPS 13 to output lead 19 and to the well of P-channel transistor 14, respectively. More specifically, P-channel transistors P14 and P15 are turned off when MPS 11 and WPS 13 are charging their pumping capacitors, which are connected to the sources of P-channel transistors P14 and P15, respectively. In particular, MPS 11 and WPS 13 boost the voltage at their respective output leads to a level significantly greater than the level of the external supply voltage. This boosting is typically achieved by charging a capacitor in the pump stage so that a first lead is at the ground potential while the second lead is at the external supply voltage level. Then the pump stage increases the voltage level at the first lead, thereby boosting, at least initially, the voltage at the second lead to a level higher than the external supply voltage level.

As MPS 11 and WPS 13 have boosted the voltage level at the sources of P-channel transistors P14 and P15, signal PMPBST is provided so as to turn on P-channel transistors P14 and P15, thereby allowing charge to redistribute from the pumping capacitors of MPS 11 and WPS 13, to the sources of P-channel transistors P14 and P15, and to output lead 19 and the well of P-channel transistor P14, respectively. In this way, charge pump 10 generates supply voltage $V_H$ and maintains the level of voltage $V_{WELL}$ so as to be equal to or higher than the levels of the voltages at the source and drain of P-channel transistor P14.

However, if the voltage level at the well of P-channel transistor P14 gets too high, the risk of junction breakdown in devices connected to the well is increased. This problem can be exacerbated during burn-in testing during which the external supply voltage is increased to a level that is higher than the normal operational level. Accordingly, there is a need for a charge pump that can limit the voltage at nodes internal to the charge pump.

SUMMARY

In accordance with the present invention, a charge pump is provided that limits the voltages at nodes internal to the charge pump. This feature can be advantageously used to reduce the risk of junction breakdown in the charge pump. One embodiment of the present invention includes a first pump circuit, a second pump circuit, a first clamping circuit and a second clamping circuit. In one aspect of the present invention, the first clamping circuit is used to limit the voltage level of a well by providing a current path from the well to the output lead when the voltage level of the well reaches a first predetermined limit. In another aspect of the present invention, the voltage level at a first node from which charge is redistributed to the well is limited by the second clamping circuit that is configured to provide a conductive path from the first node to the output lead when the voltage level of the first node reaches a second predetermined limit. Limiting the voltage levels at the well and the first node reduces the risk of junction breakdown of devices connected to the well.

In another embodiment of the present invention, the charge pump includes a pump circuit having a logic circuit and a capacitor pump circuit. In one aspect of the present invention, the logic circuit is configured, depending on the level of an external supply voltage, to vary the rate at which a capacitor node in the capacitor pump circuit is boosted. This aspect of the present invention can be advantageously used to reduce the rate at which the capacitor node can be boosted when the external supply voltage is relatively high, thereby reducing the risk of junction breakdown. In a further aspect of the present invention, in addition to varying the rate at which the capacitor node is boosted, the voltage difference between the capacitor node and the external supply voltage is varied as a function of the level of the external supply voltage. This aspect of the present invention can be advantageously used decrease the voltage level at the capacitor node relative to the level of the external supply voltage when the level of the external supply voltage is relatively high, thereby providing another mechanism to reduce the risk of junction breakdown.

BRIEF DESCRIPTION OF THE DRAWINGS

The foregoing aspects and many of the attendant advantages of this invention will become more readily appreciated by reference to the following detailed description, when taken in conjunction with the accompanying drawings listed below.

DETAILED DESCRIPTION

Figure 2:
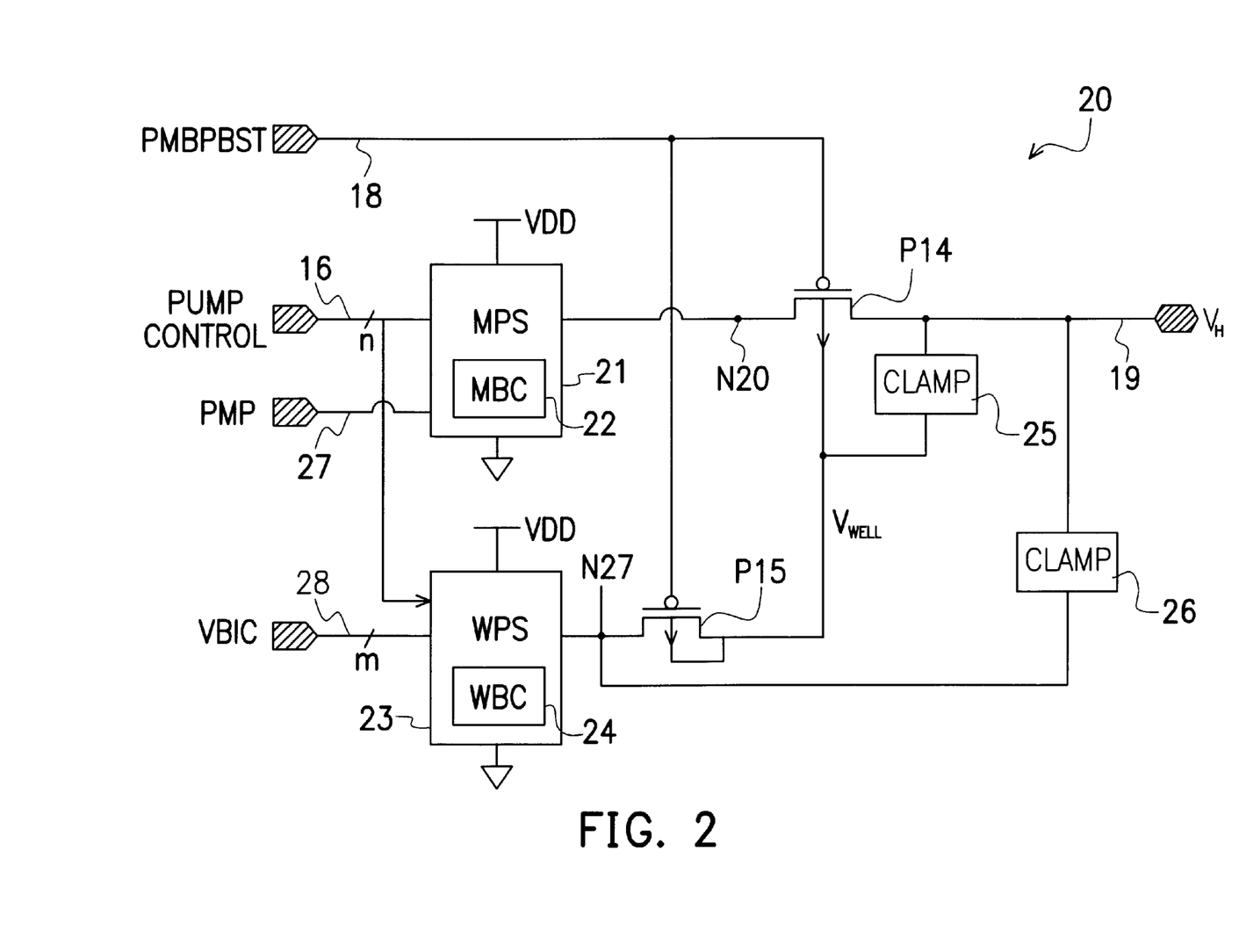
FIG. 2 is a block diagram illustrative of an integrated circuit charge pump with internal node voltage limit control, according to one embodiment of the present invention.

FIG. 2 is a block diagram illustrative of an integrated circuit charge pump 20. In accordance with one embodiment of the present invention, charge pump 20 includes internal node voltage limit control. To help promote clarity, the same reference numbers are used between drawings for elements having the same or similar function or structure. Charge pump 20 is similar to charge pump 10 (FIG. 1) except that charge pump 20 includes a main pump stage (MPS) 21 having a main burn-in control circuit (MBC) 22 and including a well pump stage (WPS) 23 having a well burn-in control circuit (WBC) 24 instead of MPS 11 (FIG. 1) and WPS 13 (FIG. 1) as in charge pump 10 (FIG. 1). In addition, this embodiment of charge pump 20 includes a clamp 25 and a clamp 26.

Charge pump 20 is interconnected as follows. MPS 21 is connected to receive the pump control signals via line 16 as in charge pump 10 (FIG. 1). In this embodiment, MBC 22 of MPS 21 is connected to receive a burn-in pump control signal BPMP via a line 27. The output lead of MPS 21 is connected to the source of P-channel transistor P14 through a node N20. The gate of P-channel transistor P14 is connected to receive pump boost signal PMPBST. The drain of P-channel transistor P14 (i.e., output lead 19) is connected to one lead of clamp 25. The other lead of clamp 25 is connected to the N-well of transistor P14 and the drain of transistor P15.

WPS 23 is also connected to receive the pump control signals via line 16 as in charge pump 10 (FIG. 1). In this embodiment, WBC 24 of WPS 23 is connected to receive a well pump burn-in control signal WBIC via a line 28. The output lead of WPS 23 is connected to the source of P-channel transistor P15 through a node N22. The gate of P-channel transistor P15 is connected to receive pump boost signal PMPBST. The drain of P-channel transistor P15 is connected to the N-well of transistor P14 and the drain of transistor P15. Clamp 26 is connected between node N22 and output lead 19.

Charge pump 20 operates as follows. During normal mode operation, signals BPMP and WBIC are provided so as to configure MBC 22 and WBC 24 into the normal mode. When in the normal mode, MBC 22 inter-operates with the rest of the circuitry of MPS 21 so that, in response to the pump control signals received from line 16, MPS 21 boosts the voltage level at node N20 in essentially the same manner as MPS 11 (FIG. 1). As MPS 21 boosts the voltage level at node N20, P-channel transistor P14, in response to signal PMPBST, allows charge to redistribute from node N20 to output lead 19. With the proper assertion of the control signals, the level of voltage $V_H$ is maintained at the desired level.

Likewise, in the normal mode, WBC 24 inter-operates with the rest of the circuitry of WPS 23 so that, in response to the pump control signals received from line 16, WBC 23 boosts the voltage level at node N22 in essentially the same manner as WPS 13 (FIG. 1). As WPS 24 boosts die-voltage level at node N22, P-channel transistor P15, in response to signal PMPBST, allows charge to redistribute from node N22 to the well of P-channel transistor P14. In this manner, the level of voltage $V_{WELL}$ is maintained at a level equal to or higher than the level of voltage $V_H$ and the voltage level at node N20.

In accordance with the present invention, clamps 25 and 26 are used to limit the level of voltage $V_{WELL}$ and node N22, respectively, so as to prevent junction breakdown in devices connected to the well of P-channel transistor P14. Clamp 25 is configured to limit the level of voltage $V_{WELL}$ by providing a discharge path from the well of P-channel transistor P14 to output lead 19 when the level of voltage $V_{WELL}$ reaches a predetermined threshold value. For example, clamp 25 can be implemented with a diode having its anode electrically connected to the well of P-channel transistor P14 and its cathode connected to output lead 19. Thus, the level of voltage $V_{WELL}$ is limited to about a diode threshold voltage above the level of voltage $V_H$, which helps prevent junction breakdown in devices connected to the well of P-channel transistor P14.

Similarly, clamp 26 is configured to limit the voltage level at node N22 by providing a discharge path from node N22 to output lead 19 when the voltage level at node N22 reaches a predetermined threshold value. For example, clamp 26 can be implemented with a diode having its anode electrically connected to node N22 and its cathode connected to output lead 19. Thus, the voltage level of node N22 is limited to about a diode threshold voltage above the level of voltage $V_H$, which-helps prevent junction breakdown in devices connected to the well of P-channel transistor P14 by limiting the boosted voltage used in transferring charge to the well of P-channel transistor P14.

During the burn-in mode, the level of the external supply voltage VDD is increased to about 4.5 volts for burn-in testing in this embodiment, but as will be appreciated by those skilled in the art, the burn-in voltage is technology dependent. Because the amount of boosting provided MPS 21 and WPS 23 at nodes N20 and N22 is typically dependent on the level of supply voltage VDD, the boosting at nodes N20 and N22 is typically significantly higher than during normal operation. Thus, even though clamps 25 and 26 help limit the level of voltage $V_{WELL}$, these clamps would not prevent the high level of external supply voltage VDD during burn-in from causing MPS 21 and WPS 23 to boost the voltage level at nodes N20 and N22 to these relatively high levels. Because a finite amount of time is needed to transfer charge from nodes N20 and N22 to output lead 19 and the well of P-channel transistor P14, if the boosting rate at nodes N20 and N22 is greater than rate that charge redistributes through transistors P14 and P15, the resulting greater voltage development at nodes N20 and N22 relative to the sources of transistors P14 and P15 can result in junction breakdown in devices connected to nodes N20 and N22.

In accordance with the present invention, MBC 22 and WBC 24 are configured to slow the rate of boosting at nodes N20 and N22 during burn-in mode. Slowing down the rate of boosting during burn-in mode helps provide more time for charge to redistribute from nodes N20 and N22 to output lead 19 and the well of P-channel transistor P14 while MPS 21 and WPS 23 are boosting these nodes. As a result, the maximum voltage level at nodes N20 and N22 during boosting is reduced, thereby reducing the risk of junction breakdown in devices connected to nodes N20 and N22. In a further refinement, as well as slowing the boosting rate, WBC 24 can be configured to further limit the boosting level at node N22 during burn-in. Embodiments of MBC 22 and WBC 24 are described below in conjunction with FIG. 3.

Figure 3:
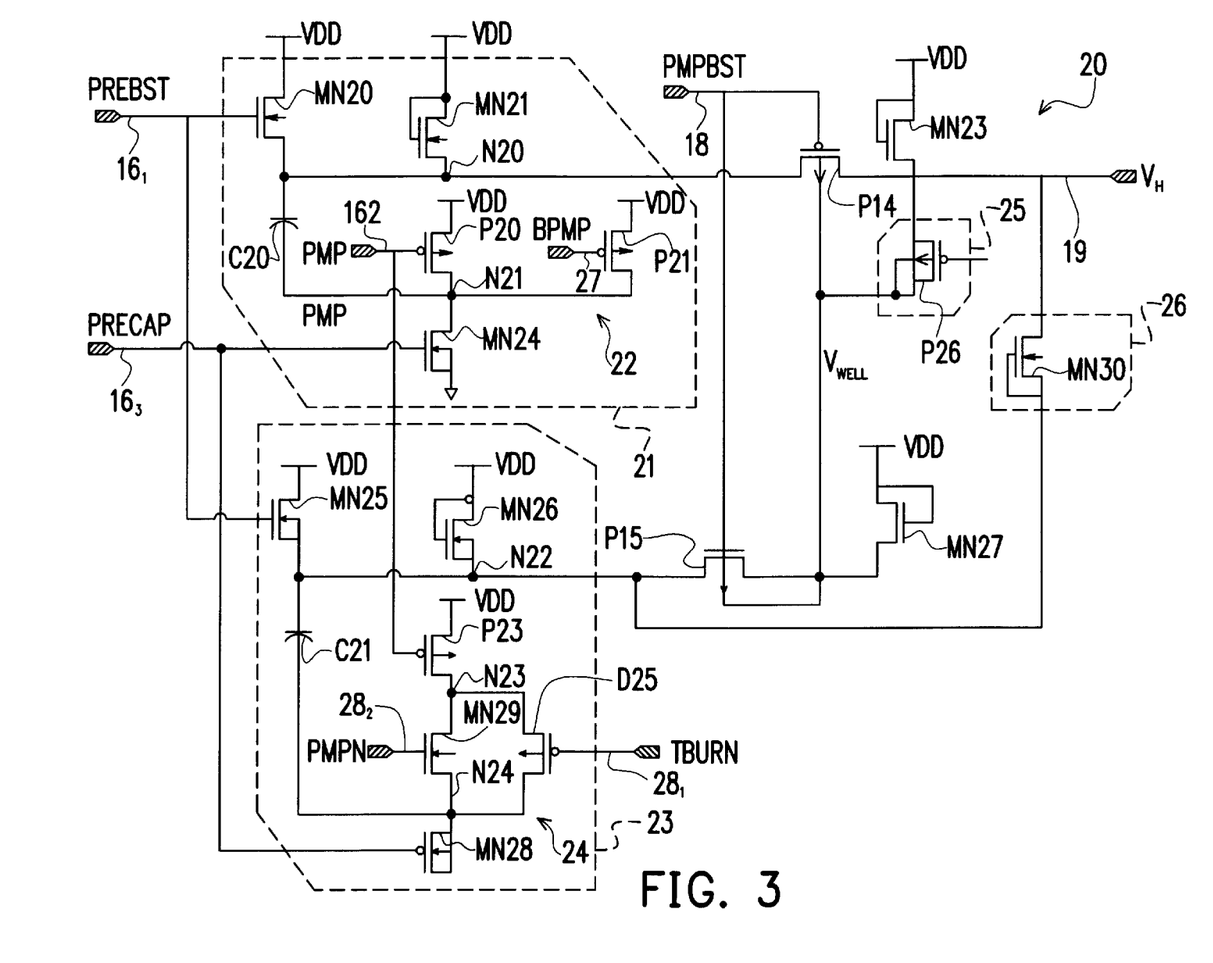
FIG. 3 is a schematic diagram illustrative of an integrated circuit charge pump implementing the block diagram of FIG. 2.

FIG. 3 is a schematic diagram illustrative of charge pump 20 (FIG. 2). In this embodiment, MPS 21 is implemented with N-channel transistors MN20, MN21, and MN24, P-channel transistors P20 and P21, and a capacitor C20. P-channel transistor P21 also serves as MBC 22.

MPS 21 is interconnected as follows. N-channel transistor MN20 has its source, gate and drain connected to the VDD supply bus, a line $16_1$ and node N20, respectively. Line $16_1$ is a component line of line 16 (FIG. 1) for propagating the pump control signals. In this embodiment, line $16_1$ propagates a pre-boost signal PREBST. Pre-boost signal PREBST is selectively asserted and deasserted when precharging node N20, as described in more detail below. When asserted, preboost signal PREBST has a level that is greater than the level of external supply voltage VDD.

N-channel transistor MN21 is connected as a diode with its anode connected to the VDD supply bus and its cathode connected to node N20. Capacitor C20 is connected between node N20 and a node N21. P-channel transistor P20 has its source, gate and drain connected to the VDD supply bus, a line $16_2$, and node N21. Line $16_2$ is a component line of line 16 (FIG. 1) for propagating the pump control signals. In this embodiment, line $16_2$ propagates a pump signal PMP. Pump signal PMP is selectively asserted to a logic high level when boosting node N20, as described in more detail below.

P-channel transistor P21 has its source, gate and drain connected to the VDD supply bus, line 27, and node N21. Line 27 is connected to receive burn-in pump signal BPMP, which is selectively asserted and deasserted when boosting node N20, and is deasserted during the burn-in mode, as described in more detail below. N-channel transistor MN24 has its source, gate and drain connected to the ground bus, a line $16_3$, and node N21. Line $16_3$ is a component line of line 16 (FIG. 1) for propagating the pump control signals. In this embodiment, line $16_3$ propagates a pre-capacitor signal PRECAP. Pre-capacitor signal PRECAP is selectively asserted and deasserted when boosting node N20, as described in more detail below.

WPS 23 includes N-channel transistors MN25, MN26, MN28 and MN29, P-channel transistors P23 and P25, and a capacitor C21. WPS 23 is interconnected as follows. N-channel transistor MN25 has its source, gate and drain connected to the VDD supply bus, line $16_1$ and node N22, respectively. N-channel transistor MN26 is diode-connected, with its anode connected to the VDD supply bus and its cathode connected to node N22. Capacitor C21 is connected between node N22 and a node N24. P-channel transistor P23 has its source, gate and drain connected to the VDD supply bus, line $16_2$, and a node N23.

P-channel transistor P25 has its source, gate and drain connected to node N23, a line $28_1$, and a node N24. Line $28_1$ is a component line of line 28 (FIG. 2) for propagating the well burn-in control signals. In this embodiment, line $28_1$ connected to receive a burn-in control signal TBURN, which is asserted during burn-in mode and deasserted during the normal mode, as described in more detail below. N-channel transistor MN28 has its source, gate and drain connected to the ground bus, line $16_3$ and node N24, respectively. N-channel transistor MN29 has its source, gate and drain connected to node N24, a line $28_2$, and node N23. Line $28_2$ is also a component line of line 28 (FIG. 2) and is connected to propagate a normal mode pump signal PMPN. Normal mode pump signal PMPN is asserted during the burn-in mode and deasserted during normal mode, as described in more detail below. In other embodiments, a single signal may be used for signals TBURN and PMPN. Alternatively, signal PMPN is implemented as the inverse of signal PMP.

In addition, charge pump 20 includes a P-channel transistor P26 and N-channel transistors MN23, MN27 and MN30. P-channel transistor P26 is diode-connected, with its anode connected to the well of P-channel transistor P14 and its cathode connected to output lead 19. Thus, diode-connected P-channel transistor P26 limits the level of voltage $V_{WELL}$ to about a threshold voltage above the level of voltage $V_H$ (i.e., about $V_H+V_{tp}$). N-channel transistors MN23, MN27 and MN30 are also diode-connected. In particular, diode-connected N-channel transistor MN23 has its anode connected to the VDD supply bus and its cathode connected to output lead 19. Thus, diode-connected N-channel transistor MN23 pulls up the level of voltage $V_H$ at output lead 19 to about a threshold voltage below the level of external supply voltage VDD (i.e., $VDD-V_{tn}$). Diode-connected N-channel transistor MN27 has its anode connected to the VDD bus and its cathode connected to the well of P-channel transistor P14. Thus, N-channel transistor MN27 serves to pull up the level of voltage $V_{WELL}$ to about a threshold voltage below the level of external supply voltage VDD (i.e., $VDD-V_{tn}$). Diode-connected transistors MN23 and MN27 pull up the voltage at their sources during power-up to help ensure proper initialization. Diode-connected N-channel transistor MN30 has its anode connected to node N22 and its cathode connected to output lead 19. Thus, N-channel transistor MN30 limits the voltage level at node N22 to about a threshold voltage above the level of voltage $V_H$ (i.e., $V_H+V_{tn}$).

Figure 4:
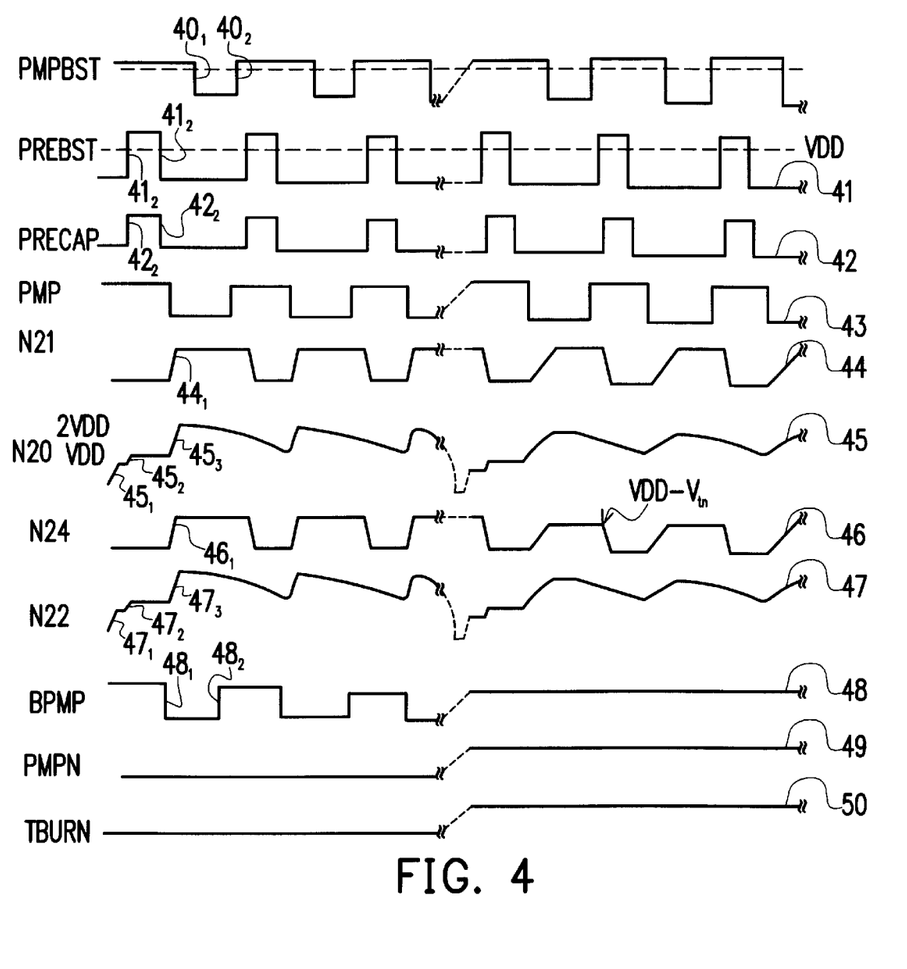
FIG. 4 is a timing diagram illustrative of the operation of the integrated circuit charge pump of FIG. 3.

FIG. 4 is a timing diagram illustrative of the operation of charge pump 20 (FIG. 3). The voltage level of signal PMPBST is represented by a waveform 40. As seen in waveform 40, signal PMPBST is, in effect, a clock signal with a boosted level during the logic high phases. The voltage level of signal PREBST is represented by a waveform 41, which is also a periodic signal with a boosted level during the logic high phases. The logic high phases of signal PREBST are slightly delayed and shorter than the logic high phases of signal PMPBST so that the logic high phases of signal PMPBST completely overlap the logic high phases of signal PREBST. The voltage level of signal PRECAP is represented by a waveform 42, which is substantially identical to signal PREBST except that signal PRECAP has a normal level (i.e., about equal to the level of external supply voltage VDD) during the logic high phases.

Signal PMP is represented by a waveform 43, which is a non-boosted periodic signal. The logic high phases of waveform 43 are longer in duration than the logic high phases of waveforms 41 and 42. In addition, the logic high phases of waveform 43 start at about the same time as the logic high phases of signal PMPBST, but are of shorter duration. Thus, the logic high phases of waveform 40 completely overlap the logic high phases of waveform 43, which in turn completely overlap the logic high phases of waveforms 41 and 42.

The voltage levels at nodes N20–N22 and N24 are represented by waveforms 45, 44, 47 and 46. Waveforms 44–47 change during operation of charge pump 20 (FIG. 3) as described below. Signal BPMP is represented by a waveform 48 and during the normal mode is substantially identical to signal PMP. However, during burn-in mode, signal BPMP is deasserted and, thus, waveform 48 is shown having a logic low level during the burn-in mode. Signals PMPN and TBURN are represented by waveforms 49 and 50. During the normal mode, waveforms 49 and 50 are maintained at logic high levels. In contrast, during the burn-in mode, waveforms 49 and 50 are maintained at logic low levels. Alternatively, signal PMPN can be implemented as the inverse of signal PMP. As described previously, a control circuit (not shown) provides waveforms 40–43 and 48–50. Those skilled in the art of integrated circuits, in view of the present disclosure, can implement such a control circuit without undue experimentation.

Referring to FIGS. 3 and 4, this embodiment of charge pump 20 operates as follows. During the normal initialization or power-up mode, N-channel transistors MN21, MN23, MN26 and MN27 precharge node N20, output lead 19, node N22 and the well of P-channel transistor P14 to about a threshold voltage below the level of the external supply voltage VDD. In addition, signals PMPN and TBURN are at logic low levels, thereby turning off N-channel transistor MN29 and turning on P-channel transistor P25. With regard to nodes N20 and N22, the initial pre-charging is indicated by rising edges $45_1$ and $47_1$ in waveforms 45 and 47. Then with signal PMPBST being at a boosted level, signal PREBST is driven to a boosted level, as indicated by rising edge $41_1$. As a result, P-channel transistors P14 and P15 are turned off, and N-channel transistors MN20 and MN25 pull up the voltage levels at nodes N20 and N22, respectively, to about the level of external supply voltage VDD. These full-rail pull-ups of the voltage levels of nodes N20 and N22 are indicated by rising edge segments $45_2$ and $47_2$.

Signal PRECAP is asserted at about the same time as rising edge $41_1$, as indicated by rising edge $42_1$ of waveform 42. In response to the logic high level of 30 signal PRECAP, N-channel transistors MN24 and MN28 are turned on, thereby pulling down the voltage level at nodes N21 and N24, respectively. Then signals PREBST and PRECAP are deasserted, as indicated by falling edges $41_2$ and $42_2$. The logic low levels of signals PREBST and PRECAP turn off N-channel transistors MN20, MN24, MN25 and MN28.

Then the control circuit (not shown) deasserts signals PMP and BPMP, as indicated by failing edges $43_1$ and $48_1$. As previously described signals PMP and BPMP are essentially identical during the normal mode. The logic low levels of signals PMP and BPMP turn on P-channel transistors P20, P23 and P21, thereby pulling up the voltage levels at nodes N21 and N23, as indicated by rising edges $44_1$ and $46_1$. In addition, because signals PMPN and TBURN are at logic low levels, N-channel transistor MN29 is turned off and P-channel transistor P25 is turned on. As a result, the voltage levels at nodes N20 and N22 are boosted through capacitors C20 and C21, respectively, as indicated by rising edge segments $45_3$ and $47_3$. P-channel transistors P20 and P21 provide two "parallel" pull-up paths to pull up the voltage at node N21 directly. Because P-channel transistors are used as pull-up devices, the voltage level at node N20 can be boosted to the level that the capacitor is charged to, plus VDD. In a slightly different manner, the voltage level at node N22 is boosted when signal PMP is deasserted. P-channel transistors P23 and P25 provide a single pull-up path to pull up the voltage of node N24. Again, because P-channel transistors as used as pull-up devices, the voltage level at node N22 can be boosted to its previous level plus VDD.

Afterwards, signal PMPBST is deasserted, as indicated by falling edge $40_1$. The logic low level of signal PMPBST turns on P-channel transistors P14 and P15 to allow charge to redistribute to from nodes N20 and N22 to output lead 19 and the well of P-channel transistor P14, respectively. Then signals PMPBST, PMP and BPMP transition to a logic high level, as indicated by rising edges $40_2$, $43_2$ and $48_2$. The now logic high levels of signals PMPBST, PMP and BPMP turn off P-channel transistors P14, P15, P20, P23 and P21. The cycle is then repeated with the next rising edges of signals PREBST and PRECAP.

In contrast, during the burn-in mode, the control circuit (not shown) provides signals BPMP, PMPN and TBURN with constant logic high levels. As a result, P-channel transistors P21 and P25 are turned off, while N-channel transistor MN29 is turned on. The other signals are provided in substantially the same manner as in the normal mode and, thus, charge pump 20 (FIG. 4) operates during burn-in mode in substantially the same manner as normal mode, except as described below.

Because P-channel transistor P21 is off during burn-in mode, only P-channel transistor P20 is used in pulling up the voltage at node N21. Thus, capacitor C20 is "boosted" at a lower rate compared to normal mode operation. That is, during normal mode operation, P-channel transistors P20 and P21 operate to boost capacitor C20, whereas in burn-in mode, only P-channel transistor P20 is used to boost capacitor C20.

Because N-channel transistor MN29 is on and P-channel transistor P25 is off, capacitor C21 is boosted through P-channel transistor P23 and N-channel transistor MN29. However, N-channel transistor MN29 limits the pull-up of node N24 to about a threshold voltage below the level of the external supply voltage VDD (i.e., VDD–$V_{tn}$) as compared to full-rail pull-up provided by P-channel transistors P23 and P25 during normal mode operation. This reduced pull-up at node N24 not only reduces the voltage level to which node N22 can be boosted, but also reduces the rate at which capacitor C21 is boosted. As previously described, the reduced boosting of capacitors C20 and C21 during burn-in advantageously reduces the risk of junction breakdown in the devices connected to the well of P-channel transistor P14.

The embodiments of the internal charge pump voltage limit control scheme described above are illustrative of the principles of the present invention and are not intended to limit the invention to the particular embodiments described. For example, in view of the present disclosure, those skilled in the art of integrated circuits may implement embodiments of MBC 22, WBC 24 and clamps 25 and 26 that are different from those describe herein. In addition, MBC 22, WBC 24 and clamps 25 and 26 may be configured to provide different limits and boost rates than those described. Accordingly, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A charge pump formed in and on a semiconductor substance, the charge pump comprising:

a first pump circuit having an output lead and having a first switch formed in and on a well, the well having a conductivity different from a conductivity of the substance, the first pump circuit being coupled to receive an external supply voltage, wherein the first pump circuit is configured to cause the output lead to have an output voltage with a level higher than the level of the external supply voltage, and wherein the first switch comprises a P-channel transistor formed in an N-well, the drain of the P-channel transistor of the first switch being coupled to the output lead;

a second pump circuit being coupled to receive the external supply voltage, wherein the second pump circuit is configured to cause the well to have a voltage lever equal to or higher than the level of the output voltage;

a first clamp circuit coupled to the output lead and to the well, wherein the first clamp circuit is configured to provide a current path from the well to the output lead when the voltage level of the well reaches a first predetermined threshold; and a second clamp circuit coupled to the output lead and to an internal node wherein the internal node is coupled to the second pump circuit, wherein the second pump circuit is configured to provide a current path from the internal node to the output lead when a voltage level of the internal node reaches a second predetermined threshold.

2. The charge pump of claim 1 wherein the first and second predetermined thresholds are voltage levels, and the first predetermined threshold is lower than the second predetermined threshold.

3. The charge pump of claim 1 wherein the second pump circuit has a second switch, the second switch comprises a P-channel transistor with the drain of the P-channel transistor being coupled to the well and the source of the P-channel transistor being coupled to the internal node.

4. The charge pump of claim 1 wherein the first and second clamp circuits each comprises a diode.

5. The charge pump of claim 3 wherein the first clamp circuit comprises a N-channel transistor having a first threshold voltage and the second clamp circuit comprises a P-channel transistor having a second threshold voltage, the first threshold voltage having a magnitude that is greater than a magnitude of the second threshold voltage.

6. A method for limiting a voltage level of an internal node of a charge pump, the charge pump having a well and having first and second operational modes, the charge pump being coupled to a supply bus that is connected to receive an external supply voltage, the charge pump being configured to provide an output voltage with a magnitude greater than that of the external supply voltage, the charge pump being further configured to cause the well to have a voltage level with a magnitude that is greater than that of the output voltage, the level of the external supply voltage being lower in magnitude during the first operational mode than in the second operational mode, the method comprising:

boosting a voltage level at a first internal node of the charge pump at a first rate during the first operational mode, the level of the output voltage being dependent from the voltage level at the first internal node;

boosting the voltage level of the first internal node a second rate during the second operational mode, the first and second rates being different.

7. The method of claim 6 wherein boosting the voltage level at the first internal node at the first rate comprises:

causing a first switch to be selectively turned off and on during the first operational mode, the first switch being coupled to the first internal node and to the supply bus; and causing a second switch to be selective turned off and on during the first operational mode, the second switch being coupled to the first internal node and to the supply bus.

8. The method of claim 7 wherein the first internal node is selectively coupled to an output lead of the charge pump through a first capacitor.

9. The method of claim 8 wherein a P-channel transistor is used to selectively couple the first capacitor to the output lead.

10. The method of claim 6 wherein boosting the voltage level at the first internal node at the second rate comprises:

causing the first switch to be selectively turned off and on during the second operational mode; and causing the second switch to be turned off substantially throughout the second operational mode.

11. The method of claim 6 further comprising:

boosting a voltage level at a second internal node of the charge pump at a third rate during the first operational mode, the voltage level of the well being dependent from the voltage level at the second internal node; and boosting the voltage level of the second internal node at a fourth rate during the second operational mode, the third and fourth rates being different.

12. The method of claim 11 wherein the voltage level at the second internal node is boosted to be substantially equal to the level of the external supply voltage during the first operational mode and to be less in magnitude than the level of the external supply voltage during the second operational mode.

13. The method of claim 11 wherein boosting the voltage level at the second internal node at the third rate comprises:

causing a third switch to be selectively turned off and on during the first operational mode, the third switch being coupled to the supply bus and a third internal node of the charge pump; and causing a fourth switch to be turned on substantially throughout the first operational mode, the fourth switch being coupled to the second and third internal nodes.

14. The method of claim 13 wherein boosting the voltage level at the second internal node at the fourth rate comprises:

causing the third switch to be selectively turned off and on during the second operational mode; and causing a fifth switch to be turned on substantially throughout the second operational mode, the fifth switch being coupled to the second and third internal nodes.

15. The method of claim 14 further comprising:
causing the fifth switch to be turned off substantially throughout the first operational mode; and
causing the fourth switch to be turned off substantially throughout the second operational mode.

16. The method of claim 11 wherein the second internal node is selectively coupled to the well through a second capacitor.

17. The method of claim 16 wherein a P-channel transistor is used to selectively couple the second capacitor to the well.

18. A charge pump formed in and on a semiconductor substrate having a first conductivity, the charge pump having a first operational mode and a second operational mode, the charge pump comprising:
an output lead;
a first node;
a first switch coupled to the output lead and the first node, the switch being formed in an on a well, the well being formed in the substrate with a second conductivity that is different from the first conductivity, wherein the first switch is configured to selectively form a conductive path between the first node and the output lead;
a supply bus connected to receive an external supply voltage, the external supply voltage having a level that is greater in magnitude during the second operational mode than in the first operational mode; and
a first pump circuit coupled to the first node and the supply bus, wherein the first pump circuit is configured to selectively boost a voltage level at the first node to level that is greater in magnitude than the level of the external supply voltage, the first pump circuit being further configured to boost the voltage level at the first node at a first rate during the first operational mode and at a second rate during the second operational mode, the first rate being different from the second rate.

19. The charge pump of claim 18 further comprising:
a second node;
a second switch coupled to the well and the second node, wherein the second switch is configured to selectively form a conductive path between the second node and the well; and
a second pump circuit coupled to the supply bus and the second node, wherein the second pump circuit is configured to selectively boost a voltage level at the second node to level that is greater in magnitude than the level of the external supply voltage, the second pump circuit being further configured to boost the voltage level at the second node at a third rate during the first operational mode and at a fourth rate during the second operational mode, the third rate being different from the fourth rate.

20. The charge pump of claim 18 wherein the first pump circuit comprises:
a third switch coupled to the supply bus and a third node, wherein the third switch is configured to be selectively turned off and on during the first operational mode; and
a fourth switch coupled to the third node and the supply bus, wherein the fourth switch is configured to be selective turned off and on during the first operational mode substantially synchronously with the third switch.

21. The charge pump of claim 20 further comprising a first capacitor coupled to the first node and the third node.

22. The charge pump of claim 20 wherein the first, third and fourth switches are P-channel transistors.

23. The charge pump of claim 19 wherein the second pump circuit is configured to boost the voltage level at the second node to have a magnitude that is substantially equal to that of the external supply voltage during the first operational mode and to be less than the level of the external supply voltage during the second operational mode.

24. The charge pump of claim 19 wherein the second pump circuit comprises:
a fifth switch coupled to the supply bus and a fourth node, wherein the fifth switch is configured to be selectively turned off and on during the first operational mode; and
a sixth switch coupled to the fourth and a fifth node, wherein the sixth switch is configured to be turned on substantially throughout the first operational mode.

25. The charge pump of claim 24 further comprising a second capacitor coupled to the second and fifth nodes.

26. The charge pump of claim 24 wherein the second charge pump further comprises a seventh switch coupled to the fourth and fifth nodes, the second charge pump being further configured to cause the seventh switch to be turned on substantially throughout the second operational mode.

27. The charge pump of claim 26 wherein the second pump circuit is further configured to cause the seventh switch to be turned off substantially throughout the first operational mode and to cause the sixth switch to be turned off substantially throughout the second operational mode.

28. The charge pump of claim 26 wherein the second, fifth and sixth switches are P-channel transistors and the seventh switch is a N-channel transistor.

29. A charge pump formed in and on a semiconductor substrate having a first conductivity, the charge pump having a first operational mode and a second operational mode, the charge pump comprising:
an output lead;
a first node;
a first switch coupled to the output lead and the first node, the switch being formed in an on a well, the well having a second conductivity, the second conductivity being different from the first conductivity, wherein the first switch is configured to selectively form a conductive path between the first node and the output lead;
a supply bus connected to receive an external supply voltage, the external supply voltage having a level that is greater in magnitude during the second operational mode than in the first operational mode; and
first pump means, coupled to the first node and the supply bus, for selectively boosting a voltage level at the first node to level that is greater in magnitude than that of the external supply voltage, wherein the first pump means is configured to boost the voltage level at the first node at a first rate during the first operational mode and at a second rate during the second operational mode, the first rate being different from the second rate.

30. The charge pump of claim 29 further comprising:
a second node;
a second switch coupled to the well and the second node, wherein the second switch is configured to selectively form a conductive path between the second node and the well; and
second pump means, coupled to the supply bus and the second node, for selectively boosting a voltage level at the second node to level that is greater in magnitude than the level of the external supply voltage, wherein the second pump means is configured to boost the voltage level at the second node at a third rate during the first operational mode and at a fourth rate during the second operational mode, the third rate being different from the fourth rate.

31. The charge pump of claim 30 wherein the second pump means is configured to boost the voltage level at the second node to have a magnitude substantially equal to that of the external supply voltage during the first operational mode and to be less than that of the external supply voltage during the second operational mode.

* * * * *